July 29, 1958

S. L. BENDELL ET AL 2,845,562

ELECTROMAGNETIC DEFLECTION YOKE

Filed July 7, 1954

INVENTORS
SIDNEY L. BENDELL &
HERBERT G. SHEPARD
BY

ATTORNEY

July 29, 1958  S. L. BENDELL ET AL  2,845,562
ELECTROMAGNETIC DEFLECTION YOKE
Filed July 7, 1954  2 Sheets-Sheet 2
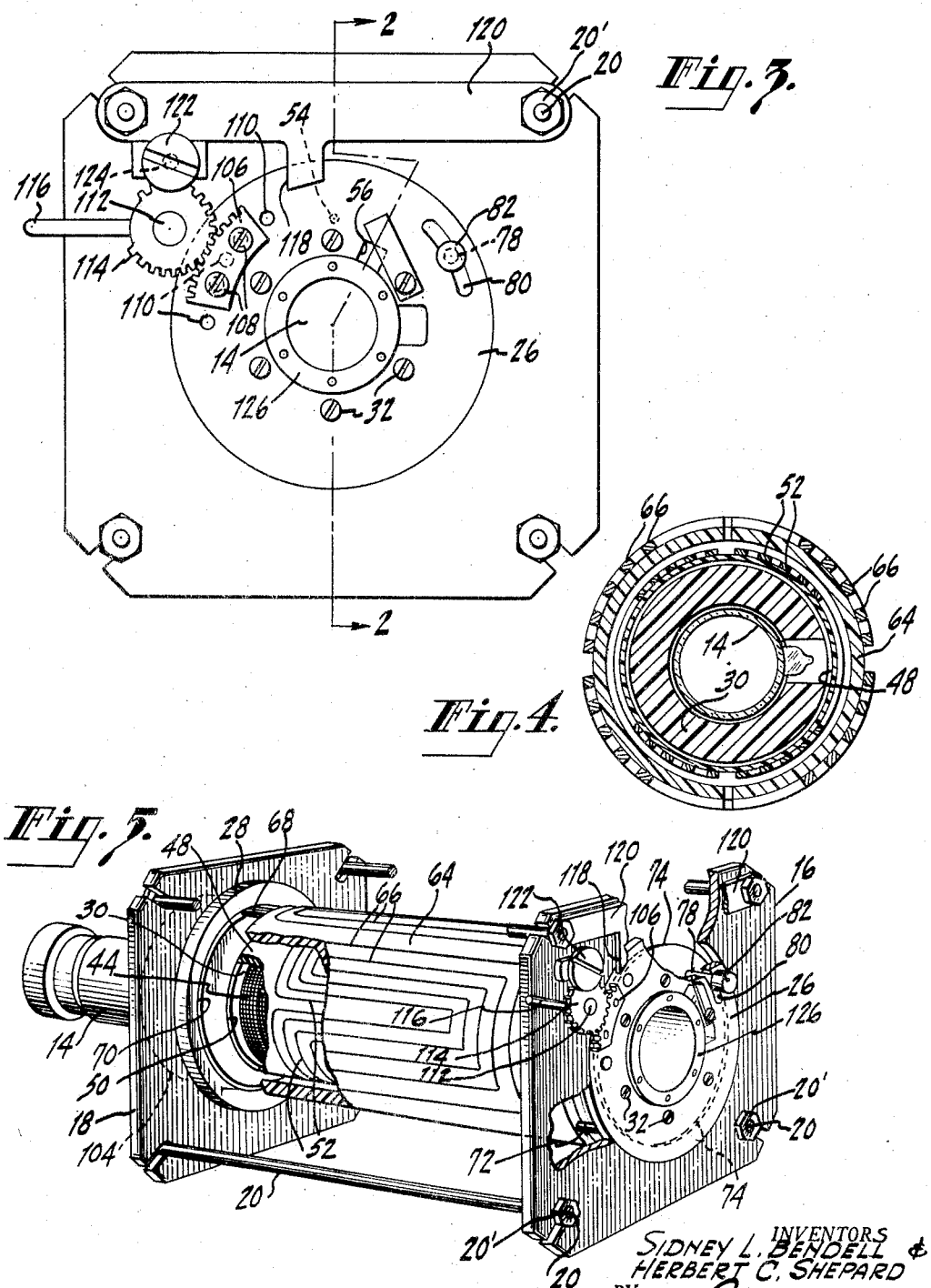
INVENTORS
SIDNEY L. BENDELL &
HERBERT C. SHEPARD
BY
ATTORNEY

2,845,562

ELECTROMAGNETIC DEFLECTION YOKE

Sidney L. Bendell, Haddon Heights, and Herbert C. Shepard, Woodbury, N. J., assignors to Radio Corporation of America, a corporation of Delaware Application July 7, 1954, Serial No. 441,892

14 Claims. (Cl. 313—76)

The present invention relates to new and improved electromagnetic deflection yokes and, more particularly, to novel yoke structures having means for causing precise mechanical adjustments therein.

As is now well-known in the television art, for example, the cathode ray beam in a television camera tube or image-reproducing tube is caused to scan a rectangular raster by means of beam deflecting agencies capable of causing simultaneous deflection of the beam in two perpendicular coordinates. One popular beam-deflecting system is that which employs electromagnetic energy and wherein a first pair of electromagnetic coils produces a field such as to deflect the beam along one coordinate, while a second pair of coils arranged at right angles to the first pair causes deflection in the perpendicular direction. Ideally, the combined effect of the two pairs of coils is that of causing the beam to trace an exactly rectangular raster. By reason of the difficulty of winding deflection coils in a precise manner and because of the problem of arranging the two pairs of coils of a deflection yoke with the necessary angular relationship, a common difficulty encountered in the art is that of raster "skew" by which is meant that error in the geometry in the scanned raster whereby the pattern scanned by the beam is in the nature of a parallelogram, rather than a rectangle.

In the type of deflection system used with the Vidicon or image Orthicon (i. e. where the focus field and deflecting coils encompass the greater length of the tube) the requirement of perpendicularity is valid only if the effective lengths of the horizontal and vertical coil pairs are exactly equal. In a practical case where it is difficult or, sometimes, a design impossibility to make the length of the two coils exactly equal, it is necessary to actually have the coils (and resulting flux fields) something other than 90° apart. For example, in one yoke assembly, it has been found that for generating a "skewless" raster it is essential that the two yokes be 82° apart rather than 90°. This peculiar effect arises by reason of the fact that the beam undergoes some rotation in traversing the length of the yoke and focus fields. The degree of rotation is determined by the period of time that the beam electrons are within the yoke field, so that, if the two deflection coils are not the same length, the rotation of the horizontal scanning lines, for instance, will be different from the case of the vertical scan.

It is a primary object of the present invention to provide novel electromagnetic deflection yoke apparatus capable of affording precise beam deflection without "skew."

As is known, the problem of skew-correction is difficult to solve through the use of electrical means and, furthermore, the cost of winding coils with the degree of precision necessary to avoid "skew" is normally prohibitive.

Hence it is a further object of the present invention to provide skew-correcting means in an electromagnetic deflection yoke, which means provide for mechanical correction in a simple but precise manner.

The matter of skew, while of real concern in the case of a single cathode ray tube, such as a monochrome television camera device, is a source of even greater difficulties when several tubes are required to scan rasters in registration. Such an arrangement is found, for example, in a three-tube color television camera arrangement where three selected component color light images from a subject are imaged onto separate camera scanning devices for the production of individual television signals representative of the colors. As will be appreciated, if any one of the three scanned rasters is skewed, the several signals produced by the camera cannot produce proper images at the receiver, since the signals themselves are necessarily out of register.

Additionally, in television image scanning, it is often necessary to orient the raster adjustably with respect to the subject being scanned and it is a further object of the present invention to provide novel electromagnetic yoke structure including means for adjusting the orientation of the raster scanned by the beam upon which the yoke flux is operating.

In general, the present invention provides, in accordance with a specific embodiment as described herein, a magnetic deflection yoke suitable for use with a Vidicon camera tube, for example, in which a first pair of coils for causing deflection in a first direction is arranged arcuately about the axis of the tube and in which a second pair of coils is supported for rotation about the first pair of coils, whereby to provide control of the angular orientation of the second pair of coils with respect to the first and in such manner as to vary the angle of deflection produced by the second pair of coils with respect to the direction of deflection attributed to the first pair of coils. Additionally, means are provided according to the invention for rotating both the first and second pairs of coils as a unit in order to effect orientation of the raster itself. As will be appreciated by persons skilled in the art, the present invention provides relatively simple means for controlling the geometry of deflection, which means are simpler and less expensive to produce than even the highly precise coils which would otherwise be necessary for eliminating skew.

Additional objects and advantages of the present invention will become apparent to persons skilled in the art from a study of the following detailed description of the accompanying drawing, in which:

Fig. 3 is a front elevational view of the apparatus of Fig. 2;

Fig. 4 is a sectional view taken along line 4—4 of Fig. 2; and

Fig. 5 is an isometric view, partially in section, and with certain portions broken away, of the apparatus of Figs. 2–4.

Figure 1:
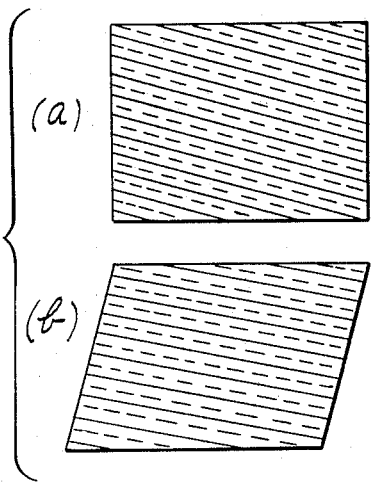
Fig. 1 illustrates two raster shapes to be described.

Referring to Fig. 1(a), there is shown diagrammatically a rectangular raster as scanned by an electron beam in a Vidicon, for example, in the desired manner. Fig. 2(b), on the other hand, illustrates the condition of skew which the present invention is capable of correcting. That is to say, and as may be noted from a comparison of Figs. 1(a) and 1(b), the latter raster, while having horizontal upper and lower borders, is in the nature of a parallelogram such that its sides are not perpendicular to its top and bottom. In order to correct the skew whereby to render the sides of the raster perpendicular to its upper and lower borders, the present invention provides means for rotating one of the pairs of coils (viz. the vertical coils) about the other pair of coils as an axis, so that the magnetic fields of the two coil pairs are properly oriented with respect to each other.

Figure 2:
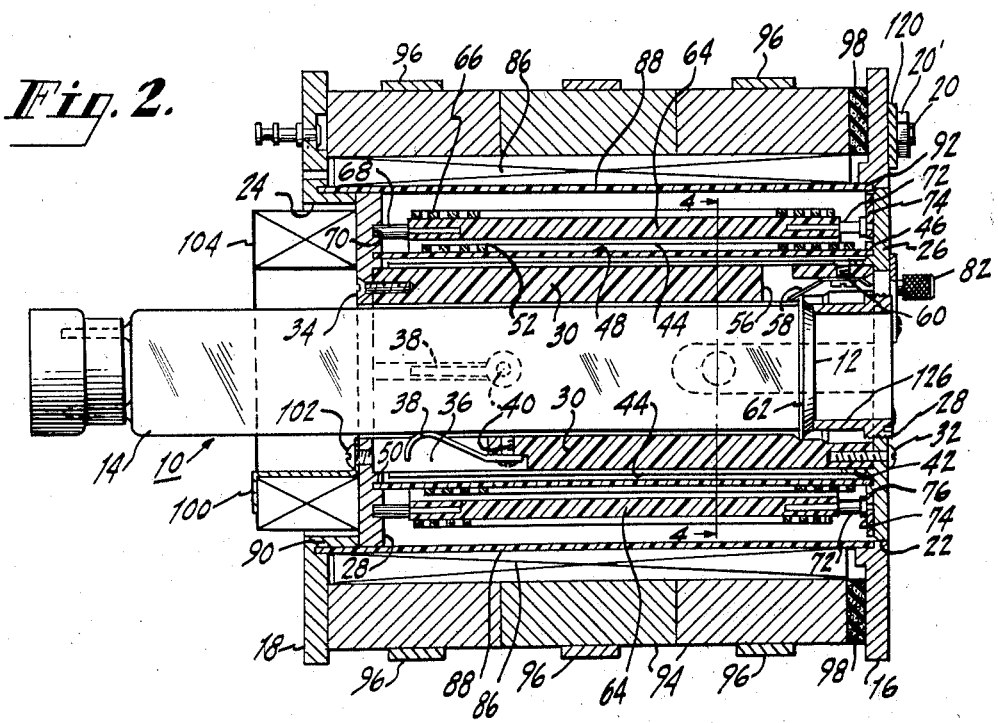
Fig. 2 is a side elevation, in section, of apparatus according to the invention (the section being along line 2—2 of Fig. 3)

A specific form of the present invention is illustrated in Figs. 2 through 5 wherein identical parts are indicated by the same reference characters. In Fig. 2, the apparatus shown is designed for association with a Vidicon tube 10 which is of generally cylindrical shape throughout its length and having a photoconductive target electrode (not shown) at its righthand end 12 and means including an electron gun (not shown) at its lefthand end 14 for directing an electron beam toward the target. Since the Vidicon does not constitute a part of the present invention it need not be described further here. A full description of such a tube may be found, for example, in an article entitled "The Vidicon Photoconductive Camera Tube," by Weimer, Forgue and Goodrich, which appeared in the May 1950, issue of Electronics.

The apparatus of the present invention is supported between front and rear support members 16 and 18, respectively, which, as shown in the isometric view of Fig. 5, are held in space relationship by means of horizontal tie rods 20. Each of the front and rear support plates 16 and 18 is provided with a circular aperture, as shown at 22 and 24. The aperture 22 in the front support plate 16 rotatably receives a disk 26 of brass or the like, while the rear support plate rotatably engages a rear disk 28 of nylon, or other suitable insulating material of the proper mechanical strength. A cylindrical mandrel 30 which is rigidly secured to the front disk 26 as by means of a plurality of bolts 32 and to the rear disk 28 by bolts 34 forms, together with the disks, the basic "bobbin" of the deflection apparatus according to the present invention. The mandrel 30, which may also be formed of nylon, is provided with a plurality (e. g. three) of slots 36 at its rear end, which slots house the Vidicon centering springs 38, each of which springs is secured to the mandrel by a bolt 40 in the manner shown. The front disk 26 is provided with a rearwardly extending axial shoulder 42 which supports an electrostatic shield cylinder 44. The electrostatic shield 44 may comprise a woven cylinder in which the filaments in the axial direction are formed of a conductor such as copper, while the filaments at right angles thereto are of a textile fabric. Such a shield structure is described in U. S. Patent 2,234,038, granted March 4, 1941, to A. V. Bedford et al.

The front disk 26 is further provided at its rear surface with a concentric groove 46 which receives the end of a cylinder 48. The cylinder 48, which may be formed of "Bakelite" (a phenolic resin sold by the Bakelite Corporation under that registered trademark) with a cloth base, is received at its rear end by a concentric groove in the rear disk 28. The cylinder 48 constitutes a support for the horizontal deflection coils 52 arranged thereon in a conventional manner as shown in Figs. 4 and 5. In order to prevent relative rotation between the horizontal coil supporting cylinder and the front and rear disks 26 and 28, a pin 54 is inserted through the front disk 26 (Fig. 3) into a notch (not shown) in the front edge of the cylinder 48. Thus it will be understood that the horizontal deflection coils 52 as supported by the cylinder 48 are rigidly secured to the bobbin comprising the front and rear disks 26 and 28, respectively, and the mandrel 30.

Before describing the arrangement of the vertical deflection coils of the yoke, and in the interest of completeness of illustration, it is to be noted that the front end of the mandrel 30 is provided with a slot or notch 56 which houses a signal clip 58 secured to the mandrel by a bolt 60 and urged by its springiness against the annular signal plate 62 of the Vidicon 10. The notch 56 also accommodates a signal output cable (not shown) which may be electrically connected to the signal clip 58 by the bolt 60 and which passes out of the front disk 26 for connection to the signal processing circuits.

A second cylinder of Bakelite is shown at 64 and has as its function that of supporting the vertical deflection coils 66. The cylinder 64 is concentrically rotated with respect to the mandrel 30 and the horizontal deflection coil support cylinder 48 for rotation thereabout and in the following manner: a plurality of pins 68 (e. g. three) is supported by the rear end of the cylinder 64 in such manner that the pins 68 extend rearwardly from the cylinder 64 and ride in a concentric groove 70 in the front surface of the rear disk 28. The front end of the cylinder 64 supports several pins 72 (e. g. two) which extend forwardly and are connected at their front ends to a skew-correcting ring 74. The skew-correcting ring 74 is supported for rotation by a concentric shoulder 76. Thus, with its rear guide pins 68 riding in the groove 70 and with its front guide pins supported by the ring 74, the cylinder 64, upon which the vertical deflection coils 66 are supported, is rotatable about the longitudinal axis of the Vidicon 10.

In order to limit the rotational movement of the vertical deflection coil support 64, since the amount of movement necessary for skew correction is not great, a pin 78 extending forwardly from the ring 74 rides in a slot 80 in the front disk 26. One end of the pin 78 is threaded through the ring 74, while its exterior end is conveniently provided with a knurled head 82. Thus, the rotation of the vertical coil supporting cylinder 64 is limited by the ends of the slot 80 and the cylinder may be fixed in any intermediate position by tightening of the knurled head 82 of the pin 78 against the front disk 26.

Before describing the second aspect of the present invention whereby the horizontal and vertical deflection coils may be rotated as a unit together with the Vidicon, the remaining elements of the apparatus shown in Figs. 2 through 5 will be described. As is understood in the art, some means must be provided for focussing the electron beam of a cathode ray tube so that it produces a fine scanning spot at the target being televised. In the case of a Vidicon, it is usual to employ a so-called electromagnetic focus coil which provides an axial magnetic field for converging the electrons of the beam. Such a coil may, for example, be of the universally wound type described and claimed in the copending U. S. application of S. L. Bendell, Patent No. 2,763,805, issued September 18, 1956, for "Electromagnetic Focus Coil for Cathode Ray Tube." Insofar as the present invention is concerned, any suitable electromagnetic focussing coil may be used. The focus coil 86 is supported concentrically about the deflection coils and Vidicon by means of a "Bakelite" cylinder 88 which is, in turn, supported by the front and rear plates 16 and 18. Specifically, the rear end of the cylinder 88 is tightly fitted around an axial extension 90 of the rear support plate while the front end of the cylinder 88 is fitted into a concentric groove 92 in the front support plate 16. Magnetic shielding for the apparatus is afforded by three rows of arcuate ferrite segments 94 which are held around the focus coil by means of straps 96. A compression washer of sponge rubber 98 or other compressible material is held between the foremost row of ferrite segments 96 and the front plate 16 by tightening of the tie rods 20. The function of the ferrite segments, in addition to that of shielding surrounding apparatus from the magnetic flux of the deflection coils, is that of furnishing a low reluctance return path for such flux whereby to increase the efficiency of the deflection coils.

Secured to the rear surface of the rear disk 28 by means of a plurality of brackets 100 (e. g. three) which are held against the rear plate by bolts 102 is a beam alignment coil 104 which serves the conventional purpose of aligning the beam within the Vidicon with respect to its longitudinal axis.

In order to permit rotation of the entire yoke assembly including the Vidicon and the horizontal and vertical deflection coils, the front and rear plates 26 and 28 are, respectively, rotatably supported by the apertured front support plate 16 and the focus coil supporting tube 88. A gear sector 106 is secured to the front surface of the front disk 26 by means of bolts 108 passed through the sector and threaded into tapped apertures 110 in the front disk 26. Supported about a pin 112 which is carried by the front support plate 16 is a gear 114 enmeshed with the sector 106. The gear 114 is provided with a radially extending handle 116 which may be grasped from the side of the assembly for rotation of the gear. It will, therefore, be understood that (as viewed in Figs. 3 and 5) movement of the gear handle 116 downwardly will cause rotation of the gear 114 in a counter-clockwise direction, with the result that the gear sector 106 will cause clockwise rotation of the front disk 26. The amount of such clockwise rotation of the gear sector 106 is limited by a detent or stop 118 which is suspended in the path of the sector from a horizontal crossbar 120. The crossbar 120 is secured to the front plate 16 by the nuts 20' which are used for tightening the tie rods 20. A locking screw 122 for fixedly holding the gear 114 against rotation is threaded into an aperture 124 in the crossbar 120.

From the foregoing, it will be understood that, with locking screw 122 turned so that it is not in frictional engagement with the gear 114, rotation of the gear 114 will result in a corresponding rotation of the gear sector 106 which causes rotation of the "bobbin." Since the Vidicon 10 is held securely in place within the mandrel portion 30 of the bobbin as by means of a Vidicon nut 126 which is threaded into the front disk 26 at 128, the Vidicon 10 will also rotate with the bobbin along with the elements supported thereby, namely the electrostatic shield 44, the horizontal and vertical coils 52 and 66 and the beam alignment coil 104. Several spaced holes 110 are provided in the front plate 26 for reception of the bolts 108, so that the gear sector 110 may be located at any one of several different positions with respect to the front disk along an arc concentric with the disk. Such adjustment is what may be termed a coarse adjustment, while the movement of the sector by rotation of the gear 114 is a fine adjustment. Once the bobbin has been rotated by the gear, the lock screw 122 may be tightened onto the gear 114 to prevent further rotation thereof. Such rotation of the entire Vidicon and deflection assembly is quite useful in orienting the scanned raster with respect to the subject being scanned, that is image information. Hence, where several Vidicons are arranged to form a tricolor television camera as shown, for example, in U. S. Patent No. 2,672,072, granted March 16, 1954, to L. T. Sachtleben et al., any one or all of the several Vidicons may be rotated with its deflection yoke for the purpose of effecting registration of the image information being scanned by the cameras.

By way of summary, therefore, it should be borne in mind that the present invention provides relatively inexpensive mechanical means for producing both forms of rotational adjustment described herein, namely, rotation of one coil pair about the axis of the other coil pair of a deflection yoke in which the two pairs are concentrically arranged and, secondly, rotation of the deflection yoke and associated cathode ray tube as a unit about the axis of the tube, all without disturbing the stationary positioning of the electromagnetic focus coil and magnetic shield segments.

Having thus described our invention, what we claim as new and desire to secure by Letters Patent is:

1. Electromagnetic deflection apparatus for a cathode ray tube, said apparatus comprising: a first deflection winding adapted to be disposed about such tube; a second deflection winding arranged concentrically with respect to said first winding; and means for rotating said second winding as a unit with respect to said first winding.

2. Electromagnetic deflection apparatus for a cathode ray tube, said apparatus comprising: a first deflection winding adapted to be disposed about such tube; a second deflection winding arranged coaxially with said first winding; and means for rotating said second winding as a unit with respect to said first winding.

3. Electromagnetic deflection apparatus for a cathode ray tube, said apparatus comprising: a first pair of arcuate deflection coils adapted to be disposed about such tube; a second pair of arcuate deflection coils arranged concentrically with respect to said first pair of coils; and means for rotating one of said coil pairs as a unit about the axis of the other of said coil pairs in such manner as to vary the angular relationship between said first and second pairs of deflection coils.

4. Electromagnetic apparatus for controlling an electron beam in a cathode ray tube, said apparatus comprising: a first deflection winding adapted to be disposed about such tube; a second deflection winding disposed concentrically about said first winding; an electromagnetic focus coil surrounding said first and second windings and substantially coaxial therewith; a support for said first winding; and means carried by said support for rotating said second winding about the axis of said first winding.

5. Electromagnetic apparatus for controlling an electron beam in a cathode ray tube, said apparatus comprising: a first deflection winding adapted to be disposed about such tube; a second deflection winding disposed concentrically about said first winding; an electromagnetic focus coil surrounding said first and second windings and substantially coaxial therewith; a stationary supporting frame for said focus coil; and means rotatably carried by said frame for supporting said first and second deflection windings in such manner as to permit relative rotation between said first and second windings and said focus coil.

6. Beam controlling apparatus for use in conjunction with a cathode ray tube, said apparatus comprising: a bobbin including a cylindrical element having front and rear end disks; a supporting frame having front and rear end plates for rotatably supporting said front and rear bobbin disks, respectively; a first deflection winding rigidly carried by said bobbin about said cylindrical element; a second deflection winding concentric about said first winding; and means carried by said bobbin disks for rotating said second deflection winding with respect to said first deflection winding.

7. Beam controlling apparatus for use in conjunction with a cathode ray tube, said apparatus comprising: a bobbin including a cylindrical element having front and rear end disks; a supporting frame having front and rear end plates for rotatably supporting said front and rear bobbin disks, respectively; a first deflection winding rigidly carried by said bobbin about said cylindrical element; a second deflection winding concentric about said first winding; means carried by said bobbin disks for rotating said second deflection winding with respect to said first deflection winding; and means for adjustably locking said last-named means against rotation.

8. Beam controlling apparatus for use in conjunction with a cathode ray tube, said apparatus comprising: a bobbin including a cylindrical element having front and rear end disks; a supporting frame having front and rear end plates for rotatably supporting said front and rear bobbin disks, respectively; an electromagnetic focus coil rigidly mounted on said supporting frame around said bobbin; a first deflection winding rigidly carried by said bobbin about said cylindrical element; a second deflection winding concentric about said first winding; and means carried by said bobbin disks for rotating said second deflection winding with respect to said first deflection winding.

9. Beam controlling apparatus for use in conjunction with a cathode ray tube, said apparatus comprising: a bobbin including a cylindrical element having front and rear end disks; a supporting frame having front and rear end plates for rotatably supporting said front and rear bobbin disks, respectively; an electromagnetic focus coil rigidly mounted on said supporting frame around said bobbin; a first deflection winding rigidly carried by said bobbin about said cylindrical element; a second deflection winding concentric about said first winding; means carried by said bobbin disks for rotating said second deflection winding with respect to said first deflection winding; and means carried by said bobbin for rotating said bobbin with respect to said supporting frame.

10. Beam controlling apparatus for use in conjunction with a cathode ray tube, said apparatus comprising: a rigid bobbin structure including a cylindrical element having front and rear end disks; a first arcuate deflection winding form rigidly supported by said bobbin about its cylindrical element; a second arcuate deflection winding form disposed concentrically about said first winding; track and rider means on said second winding form and said bobbin disks for rotating said second winding form about said cylindrical element as an axis; and means for locking said second form against such rotation.

11. The invention as defined by claim 10 which further comprises a stationary frame having front and rear plates; means on said front and rear plates for rotatably supporting said front and rear bobbin disks respectively; and an electromagnetic focus coil rigidly supported by said front and rear plates of said stationary frame around said bobbin.

12. The invention as defined by claim 11 including means for causing relative rotation of said bobbin within said stationary frame.

13. The invention as defined by claim 11 including gear means for rotating said bobbin within said stationary frame.

14. The invention as defined by claim 11 including a gear element carried by said bobbin and a gear element carried by said stationary frame for producing rotation of said bobbin within said frame.

References Cited in the file of this patent

UNITED STATES PATENTS

| | | |
|---|---|---|
| 2,404,030 | Browne | July 16, 1946 |
| 2,490,731 | Goodale et al. | Dec. 6, 1949 |
| 2,501,516 | Holden | Mar. 21, 1950 |
| 2,568,456 | Malheiros | Sept. 18, 1951 |